US005937907A

United States Patent [19]
Lee

[11] Patent Number: 5,937,907
[45] Date of Patent: Aug. 17, 1999

[54] MANIFOLD HAVING OUTLETS EQUALLY SPACED FROM INLET

[75] Inventor: Wen-Hong Lee, Hsinchu, Taiwan

[73] Assignee: Mosel Vitelic, Inc., Hsinchu, Taiwan

[21] Appl. No.: 08/665,569

[22] Filed: Jun. 18, 1996

[51] Int. Cl.[6] ...... F15D 55/00
[52] U.S. Cl. ...... 138/39; 138/42; 239/262; 239/551; 137/883
[58] Field of Search ...... 138/37, 39, 42, 138/44; 239/548, 557, 566, 550, 551, 562, 553, 553.3, 553.5, 590; 137/883, 886

[56] References Cited

U.S. PATENT DOCUMENTS

| | | | |
|---|---|---|---|
| D. 167,527 | 8/1952 | Neufeld | D91/1 |
| 1,796,878 | 3/1931 | Watson | 239/548 X |
| 2,347,123 | 4/1944 | Riesgo | 225/3 |
| 2,663,591 | 12/1953 | Pew | 239/548 X |
| 2,835,532 | 5/1958 | Galloway | 239/548 X |
| 2,914,258 | 11/1959 | Ruetsch | 239/562 |
| 3,774,851 | 11/1973 | Simmons | 137/513.5 X |
| 4,411,295 | 10/1983 | Nutter | 141/59 |

*Primary Examiner*—Patrick Brinson
*Attorney, Agent, or Firm*—Tung & Associates

[57] ABSTRACT

A manifold having a plurality of outlets each equally spaced from the inlet in the radial direction is provided. The equal spacing of the outlets from the inlet provides substantially equal flow across each outlet. Preferably, the manifold has a main body, an inlet coaxial with the main body and a plurality of outlets carried by the main body equally spaced from the inlet. A stop valve can be provided adjacent each outlet to allow each outlet to be independently closed while maintaining a substantially equal flow through the open outlets.

12 Claims, 1 Drawing Sheet

12
16
62
14
18
64
60
66
16

MANIFOLD HAVING OUTLETS EQUALLY SPACED FROM INLET

FIELD OF THE INVENTION

The present invention relates generally to manifolds and more particularly, to gas or liquid manifolds having equally spaced outlets.

BACKGROUND OF THE INVENTION

Manifolds are used in a wide variety of applications to divide an inlet flow of gas or liquid into several outlet flows. Conventional manifolds typically have a single inlet and several outlets linearly spaced on a straight tubular member. In this arrangement, the outlets are at unequal distances from the inlet and thus different flow rates occur across different outlets. This is undesirable for many applications and can also produce unacceptable results in many applications due to the unequal flow.

U.S. Pat. No. 4,411,295 discloses a device for equally filling a plurality of containers with a fluid. The device has several distributors with outlets extending downwardly from the bottom wall of a holding tank to provide the flow through each outlet.

SUMMARY OF THE INVENTION

A manifold having each outlet equally spaced from the inlet in the radial direction is provided. The outlets may also be equally spaced from the inlet in both the radial and the circumferential directions. With the outlets equally spaced from the inlet and have the same diameter openings, the flow rate across each outlet is substantially the same thereby solving the problem of unequal outlet flow. The manifold has a main body, an inlet coaxial with the body and a plurality of outlets equally spaced from the inlet on the main body. Preferably, the main body has a side wail and generally opposed top and bottom walls with the inlet received in either the top or the bottom wall while the other wall is closed on the side wall to prevent flow therethrough.

In an alternate embodiment, a stop valve is provided in each outlet to allow each outlet to be independently closed. With any number of outlets closed, the open outlets still have substantially the same or equal flow rates because they are equally spaced from the inlet and they have the same diameter openings.

Objects, features and advantages of the present invention are to provide a manifold that has substantially equal flow rate through each of its outlets, that is capable of retaining equal outlet flows with any number of outlets closed, that can be designed with any number of outlets, that can be of substantially any size, that is of a relatively simple design, that is easy to manufacture and is durable, and that has a long service life.

BRIEF DESCRIPTION OF THE DRAWINGS

These and other objects, features and advantages of the invention will be apparent from the following detailed description of the preferred and the alternate embodiments and best mode, appended claims, and accompanying drawings in which:

DETAILED DESCRIPTION OF THE PREFERRED AND ALTERNATE EMBODIMENTS

Figure 1:
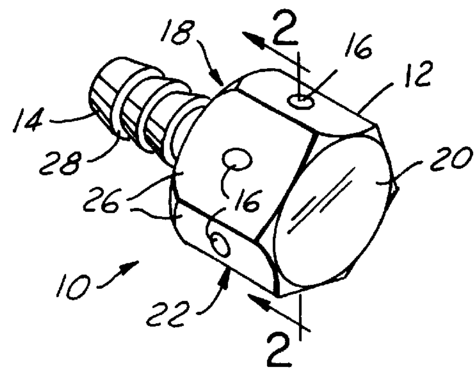
FIG. 1 is a perspective view of a manifold embodying the present invention.

FIG. 1 illustrates a manifold 10 of the present invention having a main body 12, an inlet 14 disposed adjacent to and communicating with the main body 12 and a plurality of equally sized outlets 16 carried by the main body 12 that are equally spaced from the inlet 14 in the radial and circumferential directions. In the preferred embodiment, the main body 12 has a top wall 18, bottom wall 20, and side wall 22 defining an enclosure in communication with the inlet 14 and each outlet 16. Preferably, the side wall 22 comprises a plurality of adjoining, generally rectangular, flat faces 26 of equal size. As shown in FIG. 1, the side wall 22 is comprised of six faces 26 each disposed at an obtuse included angle relative to adjacent faces 26 to form, in cross-section, an equilateral hexagon as shown in FIG. 2.

The inlet 14 is coaxial with the axis of the side wall 22 and preferably extends to the exterior of the main body 12. The inlet 14 is preferably formed with serrations 28 or threads (not shown) on its exterior constructed to retain a tube or pipe fitted over the inlet 14. Preferably, one outlet 16 is disposed adjacent each face 26 of the side wall 22 such that each outlet 16 is at an equal radial distance from the inlet 14. More preferably, each outlet 16 is disposed in the center of its respective face 26 providing outlets 16 equally spaced both radially and circumferentially relative to the axis of the side wall 22. The equal spacing of the outlets 16 from the inlet 14 provides substantially equal flow rates across each outlet 16.

Figure 2:
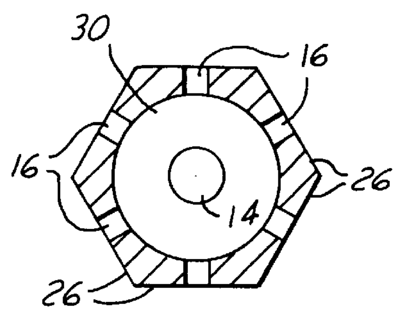
FIG. 2 is a cross-sectional view illustrating the location of the outlets and inlet.

As shown in FIG. 2, the main body 12 has a cavity 30 formed therein with the inlet 14 and each outlet 16 in communication with the cavity 30. In this embodiment the inlet 14 is received in the top wall 18 of the body 12 and the bottom wall 20 is closed on the side wall 22 to prevent flow therethrough which would significantly decrease the flow across each outlet 16. Thus, flow travels through the inlet 14, to the main body 12 and then through each outlet 16 substantially equally due to the equal distance of the outlets 16 from the inlet 14.

Figure 3:
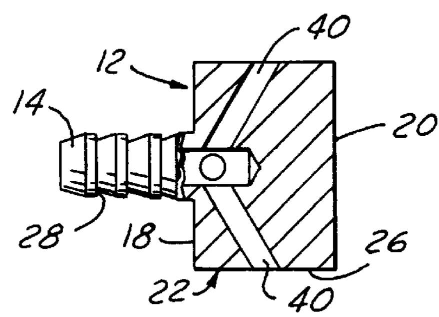
FIG. 3 is a cross-sectional view taken along line 3—3 of FIG. 1.

Alternatively, as shown in FIG. 3, the main body 12 has outlet passages 40 formed therein which communicate directly with the inlet 14. Each outlet passage 40 is of the same size in cross-section, is disposed at the same angle so that each passage 40 is of the same length and is equally spaced from the inlet 14 in the radial direction. Preferably, each outlet passage 40 is equally spaced about the sidewall 22 in the circumferential direction.

Figure 4:
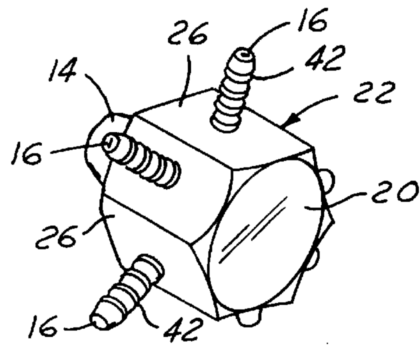
FIG. 4 is a perspective view of an alternate embodiment of the invention with outlets extending exterior of the main body.

FIG. 4 shows an alternate embodiment of a manifold 10 of the present invention having outlets 16 which extend radially to the exterior of the housing, and are substantially transverse to their respective faces 26. Preferably, the exterior surfaces of the outlets 16 are formed with serrations 42 or threads (not shown) constructed to retain a flexible tubing pressed or screwed onto each outlet 16.

Figure 5:
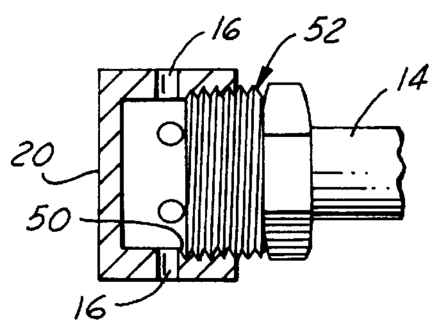
FIG. 5 is a cross-sectional view illustrating the inlet threadingly received in the main body.

Still another alternate embodiment of this invention is shown in FIG. 5. In this embodiment, a female thread 50 is disposed inside of the main body 12 adjacent either the top wall 18 or the bottom wall 20 and the opposite wall is closed on the side wall 22 to prevent flow therethrough. The female thread 50 is constructed to threadingly receive a complementary threaded member 52 carrying an inlet 14 to provide a manifold 10 that can be readily used with different inlets 14.

Figure 6:
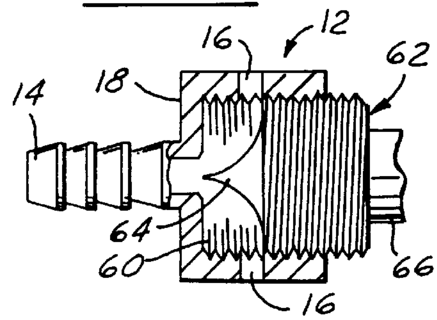
FIG. 6 is a cross-sectional view illustrating a diverting member received in the main body to direct the inlet flow towards each outlet.

In FIG. 6, the inlet 14 is received in the top wall 18 of the main body 12 and the interior of the main body 12 is provided with a thread 60. The thread 60 is constructed to receive a threaded diverting member 62 preferably having a generally conical head 64 constructed to direct the inlet flow equally towards each outlet 16. The diverting member 62 closes the lower portion of the manifold 10 to prevent flow therethrough such that the flow enters the inlet 14 and is equally dispersed through each outlet 16 in the side wall 22. To facilitate insertion of the diverting member 62 into the main body 12 of the manifold 10, a handle 66 is provided on the diverting member 62.

Figure 7:
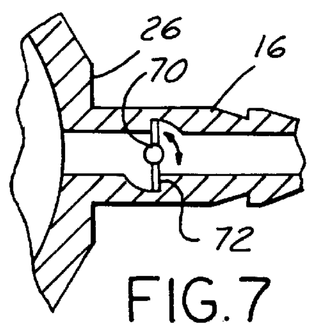
FIG. 7 is a partial cross-sectional view of an outlet having a stop valve.

In still another alternate embodiment of the invention, as shown in FIG. 7, a stop valve 70 is provided in each outlet 16 of the manifold 10 to allow each outlet 16 to be independently closed. With any number of outlets 16 fully closed, the remaining outlets 16 will have an equal flow rate across them due to the equal distance of the open outlets 16 from the inlet 14. Preferably, each stop valve 70 is only operable to filly open and fully closed positions to ensure a substantially equal flow rate across each open outlet 16. Also preferably, a seat 72 is provided in each outlet 16 adjacent the stop valve 70 to limit movement of the valve 70 to a fully closed position. If desired, the embodiment can be readily adapted to provide a manifold with variable flow rates through the outlets by providing each outlet 16 with a valve 70 movable to positions intermediate of the fully closed and fully open positions. However, unless each open valve 70 is in the same position, unequal flow rates will occur across the outlets 16 due to the different flow passage at the outlets 16.

Figure 8:
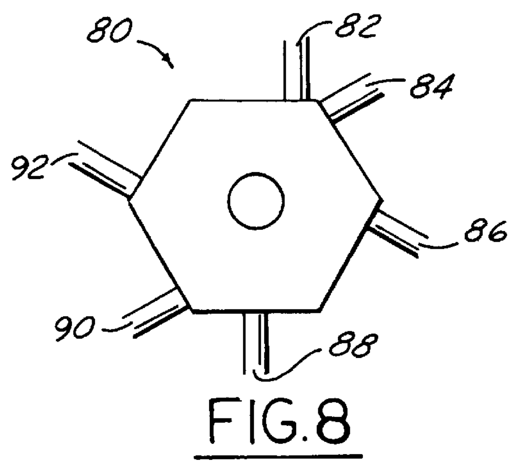
FIG. 8 is a plane view of an alternate embodiment of the invention with outlets spaced unequally in the circumferential direction from the inlet.

FIG. 8 shows yet another alternate embodiment of the invention, wherein outlets 82, 84, 86, 88, 90, and 92 of manifold 80 are positioned equally spaced in the radial direction from inlet 94 but unequally spaced in the circumferential direction from inlet 94. Equal flow rate from all outlets is still obtained as long as the outlets are equally spaced in the radial direction from the inlet.

It should be noted that the above embodiments are descriptive only, the invention should be limited only to the extent set forth in the appended claims. For example, the main body 12 can have substantially any shape as long as each outlet 16 is of equal size and is equally spaced from the inlet 14. This can be achieved in numerous ways, among them are a manifold with a spherical main body, a main body having a cylindrical side wall, or a main body forming any equilateral polygon in cross-section, to name a few.

In use, the inlet 14 of the manifold 10 is received in a flexible tube which provides the inlet flow. In the embodiment as shown in FIGS. 1 and 2, a tube or pipe is inserted into each outlet 16 to deliver the outlet flows as needed. In the embodiment as shown in FIGS. 4 and 7, a tube or pipe is press-fit or screwed over the radially extending outlets 16 to deliver the outlet flow.

Gas or liquid flows through the manifold inlet 14, into the main body 12 and then through each of the outlets 16 at a substantially equal flow rate. If desired, a valve 70 located adjacent each outlet 16 can be used to close individual outlets 16. Because the outlets 16 that remain open are equally spaced from the inlet 14, they will have substantially equal flow rates. Thus, in use, the manifold 10 provides substantially equal flow through any number of outlets 16 because the outlets 16 are of equal size and are equally spaced in the radial direction from the inlet 14.

While the present invention has been described in an illustrative manner, it should be understood that the terminology used is intended to be in a nature of words of description rather than of limitation.

Furthermore, while the present invention has been described in terms of a preferred and several alternate embodiments, it is to be appreciated that those skilled in the art will readily apply these teachings to other possible variations of the inventions.

The embodiment of the invention in which an exclusive property or privilege is claimed are defined as follows:

1. A manifold comprising a main body, an inlet and a plurality of outlets carried by the main body, said plurality of outlets are spaced equally in the radial directions from said inlet and are in fluid communication with said inlet, said plurality of outlets having openings of substantially the same diameter to produce fluid flows of substantially the same flow rate, wherein said main body has a top wall, a bottom wall and a generally cylindrical sidewall and the inlet is carried adjacent the top wall of the main body, the plurality of outlets are carried adjacent the sidewall of the main body spaced equally in the radial direction from the inlet, and the bottom wall is closed to the sidewall to prevent flow through the bottom wall, wherein said bottom wall comprises a threadingly received diverting member constructed to direct the inlet flow equally towards each outlet.

2. A manifold comprising a main body, an inlet and a plurality of outlets carried by the main body, said plurality of outlets are spaced equally in the radial direction from said inlet and are in fluid communication with said inlet, each of said plurality of outlets having substantially the same diameter opening and a stop valve therein to allow each outlet to be independently closed while maintaining substantially equal flow rates in the remaining open outlets.

3. The manifold of claim 2 wherein said stop valve is a plug constructed to be inserted into an outlet to prevent flow through the outlet.

4. The manifold of claim 2 wherein said plurality of outlets further comprising a seat formed therein constructed to limit the movement of the stop-valve to a fully closed position.

5. The manifold of claim 2 wherein said main body has a cavity formed therein in communication with said inlet and said plurality of outlets.

6. The manifold of claim 2 wherein said main body has passageways formed therein in communication with said inlet and said plurality of outlets.

7. The manifold of claim 2 wherein said main body has a top wall, a bottom wall and a generally cylindrical sidewall and the inlet is carried adjacent the top wall of the main body, the outlets are carried adjacent the sidewall of the main body spaced equally in the radial and circumferential directions from the inlet, and the bottom wall is closed to the sidewall to prevent flow through the bottom wall.

8. The manifold of claim 2 wherein said main body is constructed to threadingly receive said inlet.

9. The manifold of claim 7 wherein said bottom wall comprises a threadingly received diverting member constructed to direct the inlet flow equally towards each outlet.

10. The manifold of claim 7 wherein said sidewall comprises a plurality of adjoining, generally flat faces forming an equilateral polygon with one outlet disposed adjacent each face.

11. The manifold of claim 5 wherein a plurality of vanes are disposed in the cavity to direct the inlet flow equally towards each outlet.

12. The manifold of claim 2 wherein said plurality of outlets are spaced equally in both the radial and circumferential directions from said inlet.

* * * * *